Oct. 24, 1967    F. J. SIMAK    3,348,575
HYDRAULICALLY ACTUATABLE FLUID COUPLING
Filed Aug. 16, 1965    2 Sheets-Sheet 2
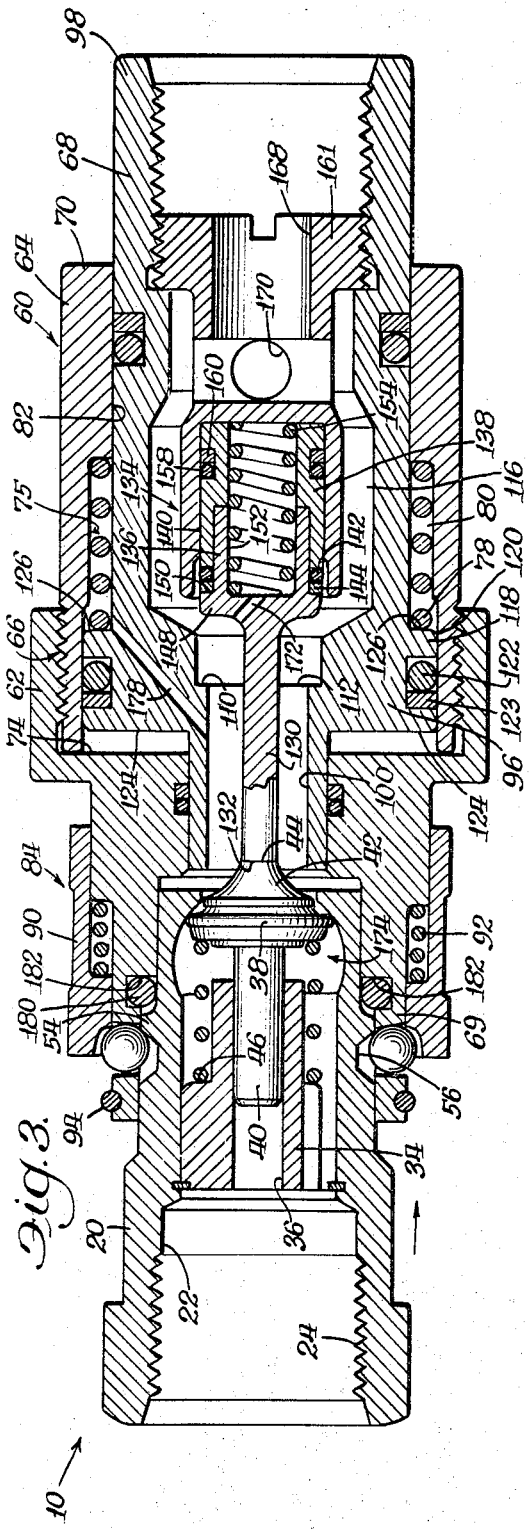
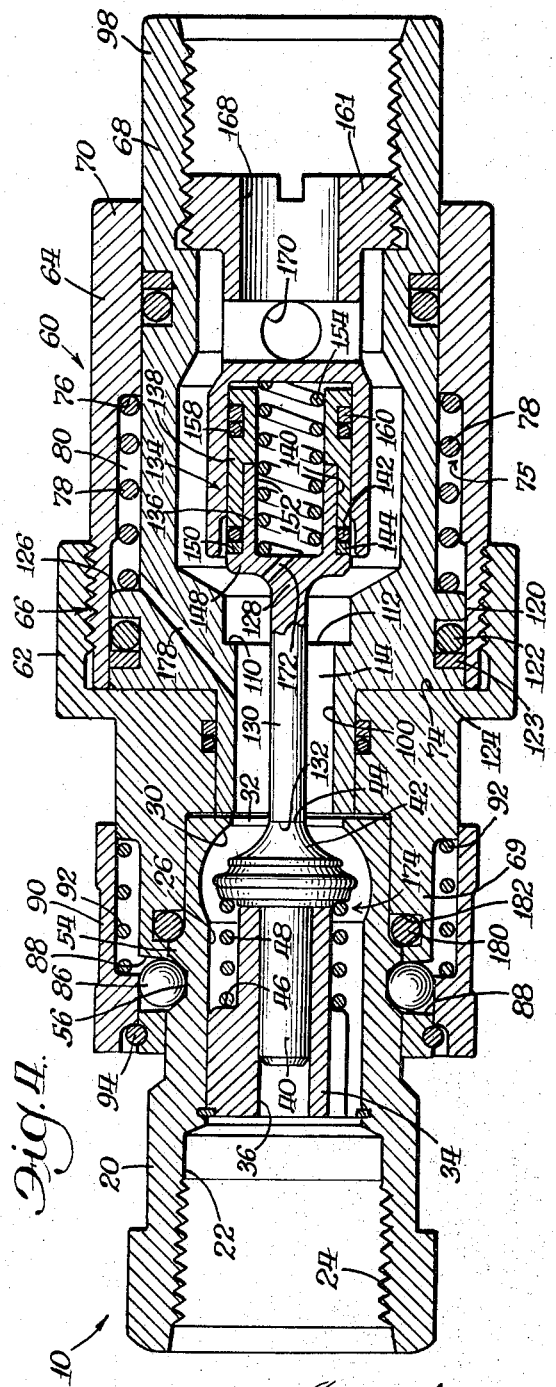
Inventor:
Frank J. Simak
Melburn E. Laundry
Atty.

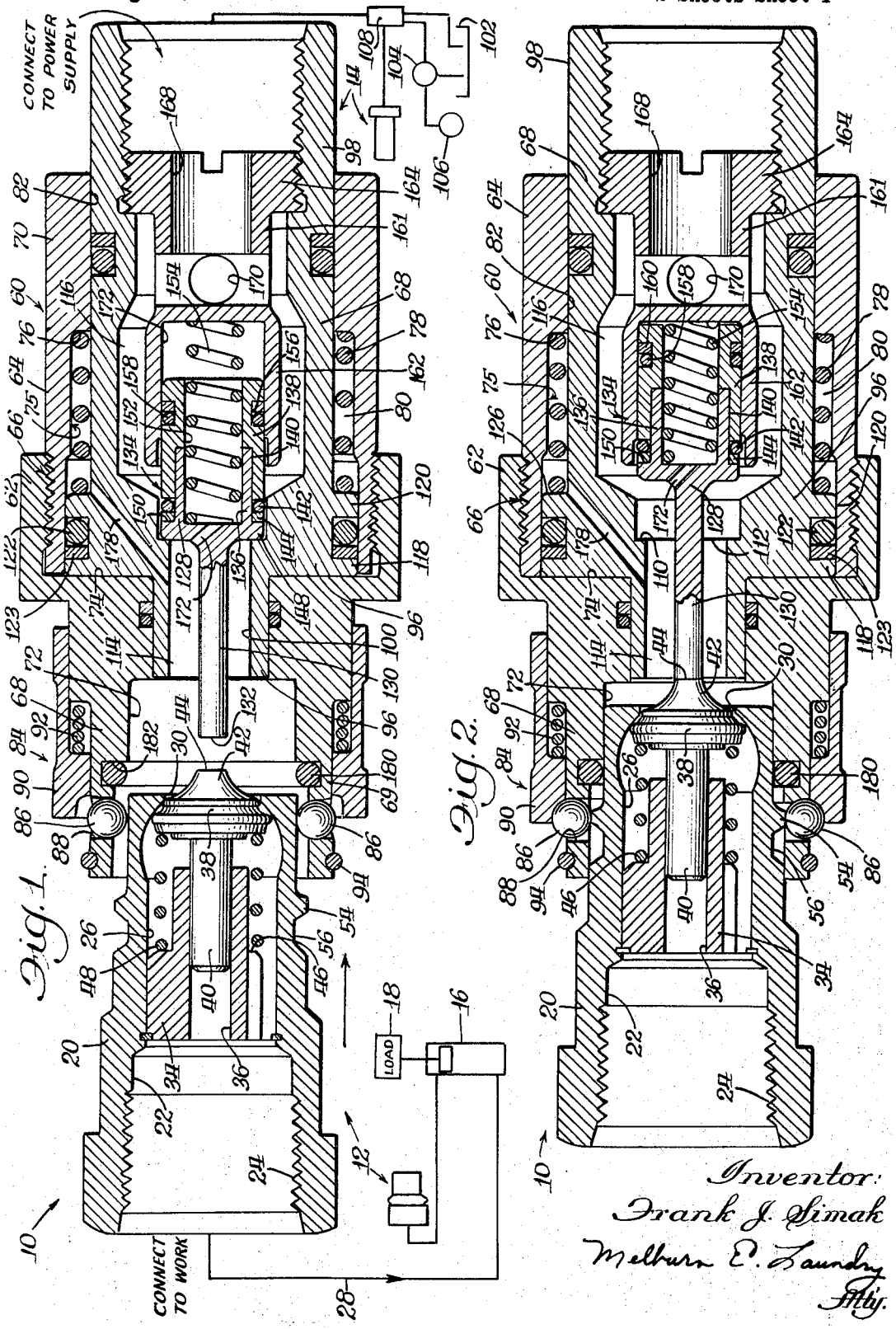

United States Patent Office 3,348,575
Patented Oct. 24, 1967

3,348,575
HYDRAULICALLY ACTUATABLE FLUID
COUPLING
Frank J. Simak, Hickory Hills, Ill., assignor to International Harvester Company, Chicago, Ill., a corporation of Delaware
Filed Aug. 16, 1965, Ser. No. 480,056
8 Claims. (Cl. 137—614.05)

This invention relates to a hydraulically actuable hydraulic fluid coupling of the quick disconnect, self-sealing poppet type and more particularly relates to a hydraulic coupling which is capable of being communicatively connected hydraulically while hydraulic fluid under pressure is trapped behind either or both poppets of the male and female coupling portions.

A problem encountered with hydraulic couplings of the quick disconnect poppet type is the difficulty of communicatively connecting the male and female portions thereof where one or both of the coupling members have high pressure hydraulic fluid trapped behind them holding their respective valve poppets closed. For instance, where a male coupling member is left over a period of time communicatively connected in a circuit to a hydraulic cylinder such as a lift cylinder under hydraulic pressure supporting a load such as a heavy agricultural implement, thermal expansion of fluid trapped behind the male coupling member may cause hydraulic fluid in the lines and the coupling member to build up to a high pressure of as much as about 6,000 p.s.i. This high pressure fluid in the male coupling member holds the male poppet against its seat and makes it extremely difficult to force the poppet back to communicatively connect the male coupling member to its female counterpart. The hydraulic fluid behind the male poppet member must somehow be relieved in order to couple the male member to the female counterpart.

One method of doing this which is frequently utilized in the field but which is not recommended because of the possible injury to the coupling is to relieve the high pressure by striking the poppet a sharp blow by taking the end of the coupling and hitting it against a rock or hitting it with a hammer to knock the poppet off its seat with the result that hydraulic fluid bleeds out behind the poppet. This method of relieving the fluid pressure in the male coupling member is not recommended since it may easily injure the male poppet member and results in the spillage of a quantity of hydraulic fluid upon the ground. Further, in the case where an agricultural implement is supported in the air, relief of the hydraulic pressure permits the implement to fall to the ground and thus creates a safety hazard. Blocking up the implement off the ground may take care of the safety hazard but it is not a popular answer since it requires additional time and effort on the part of a workman.

Additionally, it is conventionally the case that the female coupling member connected to a source of fluid pressure is maintained at a predetermined system pressure even when an associated power supply is shut off. Thus, fluid is trapped behind the female poppet member holding it firmly against its seat. While the fluid pressures behind the female poppet may be considerably lower than the fluid pressure behind the male coupling member, for instance, in a medium pressure range of about 500 to 1,500 p.s.i., this pressure still results in a problem in that it is difficult to force the female poppet off its seat to connect it to the male coupling member. While it may be possible to strike the female poppet a sharp blow to relieve the pressure behind it, as before noted this results in a flow of fluid upon the ground and may result in injury to the coupling member. Fluid pressure behind the female poppet may also be relieved hydraulically by reversing a flow of fluid thereto and shunting it to a hydraulic fluid reservoir; however, this procedure may require an additional step of starting the vehicle engine to reverse the control valve.

One prior art solution to the problem outlined above was to provide hydraulic couplings having mating screw threads which couplings were connected by physically screwing the male coupling member into the female coupling member. While such prior art couplings made it possible to communicatively connect the male and female portions when high pressure hydraulic fluid was trapped behind them, considerable torque was required to turn the screw threads necessitating the use of hand tools such as large wrenches or handle levers to which the workman was reluctant or forgot to carry with him.

An object of the present invention is to provide a hydraulic coupling that may be connected communicatively by hand without the need for hand tools while fluid under pressure is trapped behind one or both of the male and female coupling portions thereof.

Another object of the invention is to provide a hydraulic coupling wherein the male and female coupling members are capable of readily being locked together sealingly by hand while hydraulic fluid is trapped behind one or both of the members and wherein the coupling operation may be completed by hydraulically energizing the female coupling member to communicatively connect the male and female members.

Still another object of the invention is to provide a quick disconnect type self-sealing hydraulic coupling including a male coupling member to be connected communicatively to a hydraulic cylinder under pressure supporting a work-piece and a female coupling member to be connected to a source of fluid under pressure wherein the male and female coupling members are readily sealingly locked together by hand and are communicatively connected by energizing the female coupling, the operation being effected without the danger of the supported workpiece dropping to the ground and without the problem of fluid spillage upon the ground.

These and other objects of the invention will become clear from the following description when considered in conjunction with the accompanying drawings, wherein:

FIG. 1 is a schematic representation of a hydraulic system including a sectional view of two separated members of a hydraulic coupling embodying the principles of the present invention;

FIG. 2 is a sectional view of the hydraulic coupling illustrated in FIG. 1 with the male and female members thereof shown at the beginning of their movement toward an interengaging locked position;

FIG. 3 is a sectional view of the hydraulic coupling of FIGS. 1 and 2 with the male and female coupling members shown in partially locked position;

FIG. 4 is a sectional view of the hydraulic couplings of FIGS. 1–3 with the male and female coupling members shown in locking engagement and also communicatively connected.

Referring now to the drawings, a pair of identical hydraulic couplings designated generally by numeral 10 are shown, each pair including a male coupling member 12 and a female coupling member 14. The male coupling members 12, FIG. 1, are shown in circuit communicatively connected to a double-acting hydraulic cylinder 16 supporting a load which may comprise a hydraulic implement 18. The male coupling member 12 includes a valve housing 20 having a longitudinally extending bore 22 therein, the bore having first and second ends 24, 26, with the first end of the bore 24 being connected communicatively to a first fluid conduit 28, FIG. 1, leading to one end of the hydraulic cylinder 16. A valve seat 30 is provided at the second end 26 of the bore defining a fluid opening 32, FIG. 4, to that end of the bore. A 3-legged spring or check retainer 34 having a longitudinally extending opening 36 therein is secured within the bore and serves as a guide for a check poppet 38 having a stem 40 positioned within the opening 36 and being slidably movable therein in first and second directions toward and away from the valve seat 30 to block and unblock communication of the valve through the fluid opening 32 provided by the valve seat 30. The check poppet 38 has a snout portion 42 at its end opposite the stem 40, the snout extending in the second direction through the valve seat opening 32 with the check poppet in its seated position as illustrated in FIG. 1. The snout 42 has a flat forward portion 44 adapted to encounter a complementary portion of the female coupling member 14, as will be hereafter described.

The check retainer 34 has a shoulder 46 serving as a stop for a biasing spring 48 which is positioned about the check retainer's right end as viewed in the drawings, the spring biasing the male check poppet 38 against its seat to close the bore at that end. The valve body 20 is provided on its outer surface with a raised camming portion 54 and a circumferential locking groove 56 extending about the outer surface of the body, the groove providing a seat for appropriate locking means carried by the female coupling 14 and hereafter described for locking the male coupling member into the female coupling member.

While the male coupling members are shown in FIG. 1 in a hydraulic circuit including a double acting hydraulic cylinder 16 in accordance with conventional modern practice, it should be clear that it would be within the skill of the art to utilize a single-acting hydraulic cylinder in a circuit including only one fluid coupling 10 having male and female coupling members identical to the coupling members 12, 14.

The female coupling member 14 includes a cylindrical two-piece valve body or cylinder portion 60 including first and second body members 62, 64 fixedly secured together as by the threads at 66 and defining an outer cylinder or sleeve for a piston member 68 positioned within the body and adapted for sliding movement therein. The cylinder 60 has first and second ends 69, 70, the first end 69 being positioned at the left end of the cylinder member 62 and being adapted internally by means of bore 72, FIG. 1, which is generally complementary to the right-hand end of the male coupling member, to receive the male coupling member therein. The cylinder 60 is inwardly stepped at an intermediate location 75, FIG. 3, to provide a first shoulder 74 and a second shoulder 76, the first shoulder 74 providing a first limit of movement for the piston 68 and the second shoulder 76 providing a stop for a piston spring 78 positioned about the piston within a piston chamber 80 provided between the piston 68 and the cylinder 60. The cylinder 60 has an inner surface 82 at its second end 70 which is in contact with the outer surface of the piston 68 and is adapted to permit sliding movement of the outer cylinder with respect to the inner piston member 68.

The first cylinder member 62 includes locking means 84 secured thereto at its first end 68 for locking interengagement of the male and female coupling members. The locking means 84 includes a plurality of circumferentially disposed, spaced apart locking balls 86 positioned within a circumferential aperture 88 provided for this purpose about the periphery of the cylinder member 62. The diameter of the circumferential aperture 88 at its outer periphery is greater than the diameter of the balls 86; and the diameter of the opening or circumferential aperture 88 at its inner periphery is slightly smaller than the diameter of the balls preventing the balls 86 from falling into the bore 72 of the female coupling member. A sliding collar 90 is fitted about the first end of the cylinder for sliding movement in first and second directions toward the left and right of the cylinder as viewed in the drawings. A spring 92 biases the sliding collar 90 in its first direction toward the left end of the cylinder to maintain the balls in a radially inwardly protruding position, FIG. 4, and thus maintains the balls in locking engagement when so positioned within the locking groove 56 on the male coupling member. A stop ring 94 is provided at the left end of the cylinder 60 to provide a left-most limit of travel for the sliding collar 90. As is well known to effect a locking interengagement of the male and female coupling members, the sliding collar is shifted to the right as viewed in the drawings permitting the balls 86 to be cammed radially outwardly by the camming portions 54 upon movement of the male and female coupling members together as indicated in FIG. 2. Further movement of male and female coupling members together causes the locking balls 86 to move within the locking groove 88 at which time the sliding collar may be released. The collar spring 92 shifts the collar to left to direct the locking balls 86 into the groove as indicated in FIG. 4 where the collar holds the balls in place within the locking groove, locking the male and female coupling members together.

The piston member 68 has first and second ends 96, 98 correspondingly positioned to the first and second ends of the cylinder 60. The piston member includes a longitudinally extending bore 100 which is internally threaded at the second end of the piston for threaded connection to a hydraulic manifold, not shown, which may be mounted on an associated vehicle providing a source of fluid pressure. The female coupling members 14 are connected communicatively at their second ends in a fluid circuit including a fluid reservoir 102, a source of fluid pressure 104 motivated by an engine 106 of an associated vehicle, not shown, with a fluid control valve 108 provided to direct fluid pressure to one or the other of the two female coupling members 14 and to prevent a loss of fluid pressure from a female coupling member after it has been brought to a predetermined pressure.

The piston bore 100 is provided with a valve seat 110, FIG. 2, defining a fluid opening 112 between first and second fluid chambers 114, 116 within the bore. The piston member 68 has a radially outwardly extending annular flange 118 proximate its first end 96 which has an outer surface 120 complementary to a corresponding surface of the cylinder member 64 with an appropriate annular elastomeric O-ring seal 122 and backup ring 123 made of a relatively noncompressible substance such as Teflon, being positioned in an annular groove extending circumferentially about a periphery of the flange 118, for sealing engagement of the piston member within the cylinder. The flange 118 has first and second shoulders 124, 126 the first shoulder 124 being adapted to be in close contact with the shoulder 74 of the cylinder with the female coupling member in normal extended position as indicated in FIGS. 1, 2 and 4 and the second shoulder serving as a stop for spring 78. As before noted, a piston chamber 80 is provided between the piston 68 and the cylinder 60 defined by the radially inwardly stepped cylinder at 75.

A spring biased pressure balanced check poppet 128 is positioned within the bore 100, the check poppet including an elongated snout 130 having a flat forward portion 132 which is generally complementary to and adapted to encounter the flat portion 44 of the male snout 42; and a two-piece body portion 134 adapted to function as a piston and including a first body member 136 which is integral with the snout 130 and a slider portion 138. The slider portion 138 is force fitted about an outer cylindrical surface 140 of the first body member 136 so that they act as a single piston member made in two pieces to permit placement about the outer surface 140 of the member 136 of a solid noncompressible annular "Teflon" back-up ring 144 to back an elastomeric O-ring seal 142 the solid ring 144 being provided to prevent it from falling off the poppet member 136 when it moves to the left to its seat 110. The body portion 128 has an annular flange 148 proximate the snout providing a shoulder 150 for the backup ring 144. A bore 152 is provided within the body of the female poppet for receipt of a spring 154 which is relatively weaker than the piston spring 78 and adapted to bias the female poppet against its seat 110 to close communication between the first and second fluid chambers 114, 116. A circumferential groove 156 is provided about the outer surface of the slider portion 138 for receipt of a conventional elastomeric O-ring 158 and a split backup washer 160.

A poppet guide 161 is positioned within the second fluid chamber 116, the poppet guide having first and second ends 162, 164 and being in communication with the source of fluid pressure 104 by means of a longitudinally extending passageway 168 and radially extending passageways 170 at the second end 164 communicatively connecting the passageway 168 at the second end of the piston bore with the second fluid chamber 116.

The first end of the poppet guide has a generally cylindrical opening 172, FIG. 1, extending longitudinally of the bore 114 and adapted to receive the body portion of the female poppet therein. The poppet body portions 136, 138 act as a single member and are adapted to move in first and second directions toward and away from the valve seat 110 within the bore of the poppet guide. The female poppet member is pressure balanced by means of a fluid passageway 176 between the snout and the body portion communicating the bore 152 of the poppet within the cylindrical opening 172 with fluid in the vicinity of the snout 130.

A fluid transfer passageway 178 is provided in the piston 68 communicating the first fluid chamber 114 with the piston chamber. The piston spring 78 which is positioned in the piston chamber between the shoulder 126 of the piston flange and the shoulder 76 of the outer cylinder biases the piston to the left to a first limit of movement with respect to cylinder generally in the position indicated in FIGS. 1, 2 and 4.

Having now described the invention, the manner of its operation will be briefly descriped. Consider the situation illustrated in FIG. 1 wherein the male coupling member 12 is disconnected from the female coupling member but is connected communicatively to one end of a hydraulic cylinder 16 an identical male coupling member 12 being connected to the other end of cylinder 16 supporting a load comprising an implement 18 under fluid pressure. The male poppet 38 is maintained securely against its seat by the force of fluid pressure within the male coupling bore as well as by the force of the biasing spring 48, which spring and fluid forces prevent leakage of fluid from the male coupling member. Consider now that it is desired to connect the female coupling members 14 to the male coupling member 12. In the normal situation, the female coupling members would be maintained at a predetermined system fluid pressure by the fluid control valve 108. Referring to FIG. 1, to connect the male and female couplers, the locking collar 90 is moved to the right as viewed in the drawing to permit the locking balls 86 to shift radially outwardly over the camming portion 54. The male coupling member is inserted within the opening 72 of the female coupling member and the coupling members move together until the locking balls 86 ride up over the camming portion 54 as indicated generally in FIG. 2. At this point the flat forward portions 44, 132 of the male and female snouts 38, 130 encounter each other. The coupling members 12, 14 are so constructed that in order to lock the members together, it is necessary to move either the male or the female poppet away from its respective seat. Since the female poppet member is pressure balanced, that is, fluid pressure within the bore 152 of the female poppet and fluid pressure on the outside of the poppet are the same, the female poppet member may be shifted easily to the right by overcoming the force of its biasing spring 154. The poppet shifts all the way to the right within the opening 172 of its poppet guide as indicated in FIG. 2. In this condition, the male and female coupling members have not yet moved together sufficiently to permit the locking balls to fall into their locking groove 56. To effect a complete locking connection of the male and female coupling members, an additional amount of force is applied to the male coupling member against the female coupling member, forcing the female poppet, poppet guide and piston 68 which is fixedly secured to the poppet guide to the right as viewed in the drawing. In other words, what occurs is that upon application of additional force to bring the male and female coupling members together, the outer cylinder 60 of the female coupling member moves to the left from a first limit of movement with its shoulder 74 against shoulder 124 of the piston toward a second limit of movement, FIG. 3, with respect to its inner piston 68 and the poppet guide and female poppet secured thereto.

The initial movement of the female poppet to the right within the bore of its poppet guide moves the female poppet off its seat 110 and permits hydraulic fluid within the second chamber 116 to expand into the first chamber 114 which expansion is sufficient to relieve the fluid pressure within the female coupling member and to bring it down to atmospheric pressure.

This additional amount of manual force against piston spring, FIGURE 3, contracts the size of the piston chamber 80 and ultimately permits the locking balls 86 to fall within the locking groove 56 on the male coupling member. The collar member 90 of the locking means is now permitted to shift to the left, as viewed in the drawings, where it holds the locking balls inwardly into the locking groove and completely locks the male and female coupling members together sealingly. An annular O-ring seal 180 positioned within an inner groove 182 of opening 72 effectively prevents leakage of fluid from the female coupling member past the male coupling member to the ground.

At this time, however, while the male and female coupling members are locked together they are still not communicatively connected since the male check poppet remains seated firmly against its seat under the pressure of hydraulic fluid within the male coupling member. To complete the fluid connection an additional force is required to move the male check poppet off its seat. This additional force is supplied by hydraulically energizing or actuating the female coupling member. The control valve 108 directs a flow of fluid under pressure from the source of fluid pressure 104 to one of the two female coupling members 14, FIG. 1, bringing the female coupling member up to system pressure which may be, for instance, 1,000 p.s.i. Fluid flows through the openings 168, 170 provided for this purpose in the female poppet guide into the second and first fluid chambers 116, 114 and from there through the transfer opening 178 into the piston chamber to actuate the hydraulic cylinder 60, that is, the hydraulic fluid pressure forces the piston 68 to the left from the position indicated in FIG. 3 to the position indicated in FIG. 4 expanding the piston chamber and moving the poppet guide and female poppet to the left with respect to the outer cylinder 60 and the male poppet body 20 locked thereto.

This movement of the female poppet to the left as viewed in the drawing forces the male poppet off its seat against the fluid pressure within the male coupling member bore. As should be clear, the pressure area within the male coupling member comprises the area of the male poppet stem 40 and is relatively less than the overall pressure area forcing the female piston to the left, the female pressure area comprising the general area of the shoulder 126. Thus, the male poppet member moves to the left off its seat permitting fluid communication between the male and female members and bringing the pressure of fluid within the male coupling lines 28 and the hydraulic cylinder 16 to system pressure, avoiding the danger of the hydraulic implement 18 falling to the ground by a drop of pressure within the hydraulic cylinder 16.

As should be clear, separation of the male and female members is effected in approximately the reverse manner. Hydraulic power to the female coupling member 14 from the source of fluid pressure 104 is shut off; locking collar 90 is shifted to the right as viewed in the drawings and the male and female halves are permitted to separate. Separation of the coupling members is effected almost instantaneously by the pressure of fluid within the first fluid chamber 114 which tends to expand. Similarly, fluid pressure within the second fluid chamber 116 of the female coupling member and within the bore of the male coupling member causes the male and female poppets to seat almost instantaneously against their seats preventing leakage of fluid from the coupling members 12, 14 during the uncoupling operation, leakage thus being held to a minimum, being confined almost entirely to fluid within the first fluid chamber 114.

Thus, a hydraulic fluid coupling has been provided which may be readily coupled by hand without the use of any tools with pressure in either or both male and female coupling members. The female half of the hydraulic coupling being constructed like a hydraulic cylinder with a pressure balanced check poppet, can be extended or shifted off its seat with low manual force allowing the male coupling member to be connected thereto. Upon energization of the cylinder in the female coupling half with hydraulic pressure, the female coupling body retracts and completes the coupling operation, communicatively connecting the male and female coupling members.

Since modifications of the details of the structure as illustrated in the various figures are contemplated, the invention should be limited only by the scope of the appended claims.

The invention is claimed as follows:

1. A fluid coupling for connecting together the ends of first and second pressure conduits, said second conduit being connected to a source of fluid pressure, said coupling comprising:

a male coupling member having a valve body, a bore within said valve body having first and second ends, means connecting said male coupling member at said first end to said first pressure conduit, means in said body providing a valve seat at said second end of said bore defining a fluid opening, a first check poppet slidably movable within said bore in first and second directions toward and away from said valve seat, resilient means within said bore to bias said check poppet in said second direction against said valve seat, said check poppet having a snout at one end thereof proximate said valve seat; and a female coupling member having a female valve body, a bore within said female body having first and second ends, said second end of said male bore being adapted to mate within said first end of said female bore, means connecting said female body communicatively at said second end of said bore to said second pressure conduit, a sleeve mounted on said female body for sliding movement thereon, means on said sleeve providing a fluid zone between said female body and said sleeve, means on said female body cooperable with said sleeve to provide first and second limits of movement of said sleeve on said female body, said fluid zone having a predetermined volume when said sleeve is at its first limit of movement and having a predetermined lesser volume at said second limit of movement of said sleeve, first resilient means within said fluid zone biasing said sleeve toward its first limit of movement, locking means cooperable between said sleeve and said male body for releasably connecting said male and female coupling members, means providing said female bore with first and second fluid chambers proximate said first and seconds ends thereof, bore means providing a valve seat between said first and second fluid chambers, means in said female body providing a fluid passageway communicatively connecting said first fluid chamber and said fluid zone between said body and said sleeve, a pressure balanced second check poppet positioned within said bore and having a body and a snout, said poppet body being positioned in said second fluid chamber, said snout extending from said poppet body in said second fluid chamber into said first fluid chamber, said second check poppet being slidably positioned within said bore and adapted for movement in first and second directions toward and away from said valve seat to close and open communication between said first and second fluid chambers, second resilient means within said bore biasing said first check poppet in said first direction against said valve seat, said male and female coupling members being releasably coupled by inserting said male member into said female coupling member, the snout of said first poppet being adapted to engage said snout of said second check poppet, and means in said bore of said female coupling to limit movement of said second check poppet in said second direction, whereby after movement of said second check poppet to the limit of its movement in said second direction, additional force to engage said male and female couplings effects a sliding movement of said sleeve a distance toward its second limit of movement on said female body sufficient to permit engagement of said locking means, fluid communication between said female and male coupling members being established by a flow of fluid under pressure from said source to said female coupling to move said sleeve to its first limit of movement whereby said snout of said second check poppet forces said first check poppet in said first direction off its valve seat.

2. A fluid coupling for connecting together the ends of first and second pressure conduits, comprising: a male coupling member having a longitudinally extending body, an annular locking groove on an outer portion of said body, a bore within said body having first and second ends, means connecting said male coupling member at said first end of said bore to said first pressure conduit, said body having a valve seat at said second end of said bore providing a fluid passageway through said bore, a check poppet positioned within said bore and slidably movable therein in first and second directions away from and toward said valve seat to open and block said fluid passageway to a flow of fluid therethrough, said check poppet having a seated position against said seat blocking said bore passageway, resilient means within said bore biasing said check poppet in said second direction toward said valve seat tending to close said second end of said bore, said check poppet having first and second ends positioned proximate said first and second ends of said bore, said poppet having a snout at said second end thereof extending through said fluid passageway provided by said valve seat when said poppet is in said seated position, and a female coupling member having a longitudinally extending body, a bore within said female body having first and second ends, said second end of said male bore being adapted to mate within said first end of said female bore, means connecting said female body communicatively at said second end of said bore to said second pressure conduit, a sleeve slidably mounted on said female body for sliding movement longitudinally therealong, said sleeve having first and second ends proximate said first and second ends of said female body, said sleeve having a generally cylindrical inner surface being inwardly stepped at an intermediate position between said first and second ends to provide first, second, and third internal areas and a fluid zone between said body and said sleeve second internal area, a radially outwardly extending flange on said body proximate its first end cooperable with said sleeve to provide first and second limits of movement of said sleeve on said female body, said fluid zone having a predetermined volume when said sleeve is at its first limit of movement and having a relatively smaller volume at positions of said sleeve intermediate said first and second limits of movement of said sleeve, first resilient means within said fluid zone and positioned between said body flange and said sleeve third internal area biasing said sleeve in a first direction toward said first limit of movement, locking means cooperable between said sleeve first end and said male locking groove for releasably connecting said male and female coupling members, said female bore having a radially outwardly stepped portion at an intermediate location thereof defining first and second fluid chambers within said bore proximate said first and second ends thereof; a valve seat in said bore between said first and second fluid chambers, means in said female body providing a fluid passageway communicatively connecting said first fluid chamber of said bore and said fluid zone between said female body and said sleeve, a pressure balanced check poppet slidably positioned within said bore second fluid chamber and having an elongated snout extending into said first fluid chamber, said poppet being adapted for movement in first and second directions respectively toward and away from said valve seat to block and open fluid communication between said first and second fluid chambers, second resilient means within said bore biasing said check poppet with a predetermined force in said first direction against said valve seat; said male and female coupling members being releasably coupled by inserting said second end of said male member into said first end of said female coupling member, the snout of said male poppet being adapted to encounter said elongated snout of said female check poppet; and means in said bore of said female coupling to limit movement of said female check poppet in said second direction whereby after movement of said female check poppet to the limit of its movement in said second direction an additional amount of hand pressure to engage said male and female couplings effects a sliding movement of said sleeve toward said second limit of movement a distance sufficient to effect complete engagement of said locking means.

3. The coupling of claim 2 wherein said male coupling member is connected to a hydraulic cylinder under pressure and wherein said female coupling member is connected to a source of hydraulic fluid pressure to energize said female coupling member after engagement of said male and female coupling locking means by effecting a sliding movement of said sleeve to its first limit of movement.

4. A hydraulic fluid coupling for connecting together the ends of first and second conduits adapted to contain hydraulic fluid under pressure therein, said first conduit being adapted to be connected communicatively to a hydraulic cylinder to raise or lower an implement under fluid pressure, said second conduit being adapted to be connected communicatively to a source of fluid under pressure, said coupling comprising: a male and female coupling member, said male coupling member having a body, a longitudinal passageway within said body having first and second ends, means to connect said male coupling member communicatively at said first end of said passageway to said first pressure conduit; means within said passageway providing a valve seat at said second end thereof, a check poppet slidably movable within said passageway in a first direction away from said valve seat to open communication of said passageway second end, and movable in a second direction toward said valve seat to a seated position to block communication of said second end of said passageway, said poppet having first and second ends proximate said first and second ends of said passageway, said first end of said poppet having a stem, said second end of said poppet having a snout extending through said passageway proximate its second end, a guide member fixedly secured within said bore at a location intermediate said ends, said guide member having a longitudinally extending opening therein, said check poppet stem being positioned for sliding movement within said opening, means on said guide member providing a limit of movement of said check poppet in said first direction, resilient means positioned between said check poppet and said guide member biasing said poppet in said second direction to said seated position, said female coupling member having a body, a bore within said female body having first and second ends, means connecting said female coupling member communicatively at said second end of said bore to said second pressure conduit, said second end of said male coupling member being adapted to be received matingly into said female coupling member at said first end of said female bore, a generally cylindrical sleeve slidably mounted on said female body for sliding movement thereon, said sleeve having first and second ends proximate said first and second ends of said bore, said sleeve having an inner surface being internally stepped at a location intermediate said sleeve ends providing a fluid zone between said female body and said sleeve, said sleeve stepped portion having first and second shoulders proximate said first and second ends of said sleeve, said female body having a radially outwardly extending annular flange proximate said first end of said body co-acting with said first shoulder to provide a first limit of movement of said sleeve relative to said female body, resilient means positioned between said body flange and said second shoulder biasing said sleeve away from said body flange toward said sleeve's first limit of movement with respect to said female body, locking ball means fixedly secured to said sleeve at its first end and cooperative with said male body portion to releasably connect said male and female coupling members, means within said bore providing first and second fluid chambers and a valve seat therebetween, said first and second fluid chambers being proximate said first and second ends respectively of said bore, means in said female body providing a fluid passageway communicatively connecting said first fluid chamber of said bore and said fluid zone between said body and said sleeve, a poppet check retainer fixedly secured within said bore of said female body proximate said second end of said bore, said check retainer including a plug portion and a cylinder portion, said plug portion being positioned at said second end of said bore, said cylinder portion having a generally cylindrical opening facing said first end of said bore, means providing a fluid passageway in said check retainer plug portion communicatively connecting said second conduit to said bore second fluid chamber, a poppet member within said bore of said female body having a piston portion slidably positioned within said cylindrical opening in said check retainer cylinder portion, said poppet member having an elongated snout portion proximate said first end of said bore and extending from said check retainer cylinder in said second fluid chamber into said first fluid chamber, said poppet member being adapted for movement slidingly within said cylinder in a first direction toward said first end of said bore to a seated position on said valve seat to block communication between said first and second fluid chambers and being movable in a second direction to a limit of movement within said cylinder opening to open communication between said first and second fluid chambers, resilient means positioned within said cylinder biasing said poppet member in said first direction against said valve seat; means in said poppet providing a passageway communicating said cylinder opening with fluid about said poppet snout of said female coupling member said snout being adapted to engage said snout of said male coupling member poppet upon inserting said male coupling member into said female coupling member, said locking means being adapted to releasably connect said female and male couplings upon movement of said poppet of said female coupling member to its limit of movement within said cylinder opening and movement of said sleeve a predetermined distance away from its first limit of movement relative to said female body toward a second limit of movement, fluid communication between said male and female coupling members being established by energizing said female coupling member with said source of fluid under pressure to move said sleeve to its first limit of movement to force said poppet of said male coupling member away from its seat.

5. A hydraulically actuatable fluid coupling for connecting the ends of first and second fluid conduits adapted to contain fluid under pressure, said first fluid conduit being adapted to be connected communicatively to a hydraulic work producing device supporting an implement under pressure, said second conduit being adapted to be connected to a source of fluid pressure, said coupling comprising a male coupling member and a female coupling member, said male coupling member including a valve housing having a bore therein, said bore having first and second ends, said first end of said bore being connected communicatively to said first fluid conduit, said male member having a valve seat at its second end, a poppet valve slidably movable within said bore in first and second directions, resilient means within said bore biasing said poppet in said second direction toward said second end of said bore to close a fluid opening therein provided by said valve seat, said poppet valve being movable in a first direction toward said first end of said bore away from said valve seat to permit a flow of fluid to or from said male coupling member through said fluid opening provided by said valve seat;

said female coupling member being generally complementary to and adapted to receive said male coupling member therein, locking means on said female coupling member adapted to cooperate with said male coupling member to releasably lock said male and female coupling members together, said female coupling member including a valve body, said body having a valve bore therein having first and second ends, said female coupling member being connected communicatively to said second fluid coupling at said second end of said bore, a valve seat within said bore between said first and second ends defining first and second fluid chambers within said bore; a spring biased pressure balanced poppet within said female bore, said poppet including a longitudinally extending snout portion and a piston body portion, said snout portion being positioned within said first fluid chamber, said piston body portion being positioned within said second fluid chamber and being movable in first and second directions to first and second limits of movement toward and away from said valve seat to close and open said valve respectively, said piston body portion of said poppet being generally cylindrical in shape and having an annular flange proximate said snout portion, said poppet having a slider member fixedly secured thereto, a poppet guide positioned within said second fluid chamber and being fixedly secured within the bore of said female valve body, said poppet guide having a generally cylindrical opening therein positioned proximate said valve seat, said opening extending toward said first end of said bore, said poppet slider member being positioned within the opening of said poppet guide and being adapted for sliding movement therein with said poppet body portion, said slider member being internally stepped to receive said body portion matingly therein, a solid substantially non-compressible seal back-up ring positioned about said piston body portion adjacent said annular flange, an annular elastomeric seal positioned about said body portion adjacent said back-up ring between said ring and said poppet slider member, means within said poppet guide providing a fluid passageway between said second end of said valve bore and said second fluid chamber therein, resilient means positioned within said opening of said poppet guide member biasing said check poppet of said female coupling member in said first direction against its seat, cylinder means encircling said female valve body and adapted to receive said female body for sliding movement as a piston therein; means providing a fluid piston chamber between said cylinder means and said female body, resilient means within said piston chamber biasing said cylinder means to a first limit of movement with respect to said female body providing a piston chamber of a predetermined volume, said cylinder means having a second limit of movement, said piston chamber having a decreased volume at said second limit of movement, means in said female body providing a fluid passageway between said first fluid chamber and said piston chamber, said snout of said poppet of said female coupling member being adapted to encounter said snout of said check poppet of said male coupling member during connection of said male and female coupling members, said connection being effected by moving said check poppet of said female coupling member to its second limit of movement within said poppet guide and said cylinder means a predetermined distance toward its second limit of movement with respect to said body, whereby upon a flow of fluid under pressure from said source of fluid pressure to said female coupling member, said fluid flows through said poppet guide into said second and first fluid chambers and into said piston chamber tending to move said cylinder means to its first limit of movement with respect to said female body effecting a relative movement of said poppet of said female coupling with respect to said cylinder means toward said check poppet of said male coupling member to move said check poppet of said male coupling member in said first direction off its seat to open communication between said male and female couplings.

6. A fluid coupling apparatus for connecting together ends of first and second pressure conduits, comprising: a male coupling having a body, an annular locking groove on an outer portion of said body, a bore within said body having first and second ends, means connecting said male coupling at said first end of said bore to said first pressure conduit, a valve seat within said bore at said second end thereof providing a fluid opening at said second end of said bore, a poppet valve slidably movable within said bore in first and second directions away from and toward said valve seat to open and close said bore respectively, and resilient means within said bore biasing said poppet valve in said second direction against said valve seat to close said second end of said bore, said poppet valve having a snout portion extending in said second direction toward said opening provided by said valve seat;

and a female coupling, said female coupling including a cylinder member and a piston member positioned therein, said piston member having radially outer and inner surfaces and being adapted for sliding movement within said cylinder member, said cylinder member having first and second ends, said piston member having correspondingly positioned first and second ends, said cylinder member having a radially inwardly extending annular portion at said second end thereof, said annular portion being complementary to and being adapted to slide on said outer surface of said piston, said piston member having a radially outwardly extending annular flange proximate its first end adapted to serve as a stop member to said annular portion of said cylinder member;

means providing a piston fluid chamber between said cylinder annular portion and said piston flange, releasable locking means at said first end of said female cylinder being adapted to fit about said second end of said male coupling member and adapted to lock within said annular locking groove of said male body portion, means within said female piston portion providing a fluid passageway between said bore of said piston member proximate its first end and said piston fluid chamber, said female piston member inner surface including means providing a valve seat intermediate said first and second ends defining first and second fluid chambers proximate said first and second ends of said bore, a pressure balanced check poppet positioned within said bore and movable therein in first and second directions toward and away from said valve seat to close and open communication between said first and second fluid chambers, said poppet having a snout portion extending longitudinally within said first fluid chamber and having a generally cylindrical shaped body portion positioned within said second fluid chamber, said valve seat providing a first limit of movement of said valve poppet, said body portion of said poppet having a bore therein, said check poppet body portion having a flat radially extending surface facing in said first direction toward said valve seat, stop means within said bore of said female piston member providing a second limit of movement of said valve poppet in said second direction away from said valve seat, resilient means within said bore of said female check poppet biasing said poppet away from said stop means against said valve seat, said male and female snout portions being adapted to mate with said female and male couplings connected together, said piston portion of said female coupling member being adapted to move a distance toward said second direction with respect to said cylinder sufficient to permit locking engagement of said male and female coupling members, and a source of fluid under pressure for providing a flow of fluid under pressure after said male and female coupling members have been locked together, said fluid moving through said female portion to said piston chamber tending to move said piston portion and said female poppet of said female coupling in said first direction with respect to said cylinder to move said male poppet off its seat and open fluid communication between said male and female couplings.

7. A fluid coupling for connecting together the ends of first and second pressure conduits in first and second fluid circuits, said first fluid circuit connected to said first pressure conduit including a hydraulic work producing device to operate a hydraulic implement, said second fluid circuit connected communicatively to said second pressure conduit including a fluid reservoir, a source of fluid pressure, a flow control valve to direct fluid from said source to said second pressure conduit, said fluid coupling comprising: a male coupling member having a longitudinally extending body, a locking groove on an outer portion of said body, a bore within said body having first and second ends, means connecting said male coupling member at said first end of said bore to said first pressure conduit;

said body having a valve seat at said second end of said bore providing a fluid passageway through said bore, a spring biased check poppet positioned within said bore and slidably movable therein in first and second directions away from and toward said valve seat to open and block said fluid passageway to a flow of fluid therethrough, said check poppet being spring biased to a seated position against said seat blocking said bore passageway, said check poppet having first and second ends positioned proximate said first and second ends of said bore, said poppet having a snout at said second end thereof extending outside said male coupling member, when said poppet is in said seated position;

and a female coupling member having a body, a bore within the female body having first and second ends, said second end of the male body being adapted to mate within said first end of said female bore.

means connecting said female body communicatively at said second end of said bore to said second pressure conduit; a sleeve slidably mounted on said female body for sliding movement longitudinally therealong, said sleeve having first and second ends proximate said first and second ends respectively of said female body, said sleeve having a generally cylindrical inner surface being inwardly stepped at an intermediate position between said first and second ends to provide an annular fluid zone between said female body and said sleeve second internal area, a radially outwardly extending flange on said body proximate its first end cooperable with said sleeve to provide first and second limits of movement of said sleeve on said female body, said fluid zone having a predetermined volume when said sleeve is at its first limit of movement and having a predetermined lesser volume as said sleeve moves toward said second limit of movement, resilient means within said fluid zone biasing said sleeve toward said sleeve's first limit of movement, locking means on said sleeve first and cooperable with said female coupling members, said female bore having a valve seat therein defining first and second fluid chambers within said bore proximate said first and second ends thereof, means in said body providing a fluid passageway communicatively connecting said first fluid chamber of said bore and said annular fluid zone, a pressure balanced check poppet slidably positioned within said bore having a piston portion in said second fluid chamber and having a snout extending therefrom into said first fluid chamber, said poppet being adapted for movement toward and away from said valve seat to block and open fluid communication between said first and second fluid chambers, spring means within said bore biasing said check poppet with a predetermined force against said valve seat, said male and female coupling members being releasably coupled by inserting said second end of said male member into said first end of said female coupling member, the snout of said male poppet being adapted to encounter said elongated snout of said female check poppet, means in said bore of said female coupling to limit movement of said female check poppet in said second direction whereby after movement of said female check poppet to the limit of its movement in said second direction an additional amount of force to overcome said resilient means within said fluid zone effects a sliding movement of said sleeve toward said second limit of movement a distance sufficient to permit locking engagement of said male and female coupling members, said coupling members being communicatively connected thereafter by directing a flow of fluid pressure from said source of fluid pressure to said female coupling member to effect a sliding movement of said sleeve toward its first limit of movement to move said female poppet toward its seat to unseat said male poppet and establish fluid communication therebetween.

8. A fluid coupling for connecting together the ends of first and second pressure conduits, comprising: a male coupling member having a valve body, a bore within said body, having first and second ends, means in said body providing a valve seat at said second end of said bore defining a fluid opening, a male check poppet slidably movable within said bore in first and second directions toward and away from said first end of said bore to block said fluid opening upon movement in said second direction and to unlock said fluid opening upon movement in said first direction away from said valve seat, resilient means within said bore to bias said check poppet in said second direction against said valve seat; said check poppet having a snout at one end thereof proximate said valve seat, and a female coupling member having a female body, a bore within said female body having first and second ends, said second end of said male bore adapted to mate within said first end of said female bore; a cylinder slidably mounted on said female body for sliding movement of said female body therein, means on said female body cooperable with said cylinder to provide first and second limits of movement of said cylinder relative to said female body, resilient means biasing said cyilnder toward its first limit of movement, locking means cooperable between said cylinder and said male body to effect locking engagement of said male coupling member with said cylinder of said female coupling member, means providing said female bore with a valve seat therein, a pressure balanced check poppet within said bore having a snout extending in a first direction toward said first end of said bore, said check poppet being slidably positioned within said bore and adapted for movement in first and second directions toward and away from said valve seat to close and open communication through said bore, resilient means within said bore biasing said check poppet in said first direction against said valve seat, said male and female coupling members being releasably coupled by inserting said male member into said female coupling member, the snout of said male poppet being adapted to engage said snout of said female check poppet, said female check poppet being movable in said second direction with a minimum of manual force to open communication between said first and second fluid chambers, and means in said bore of said female coupling to limit movement of said female check poppet in said second direction, whereby after movement of said female check poppet to the limit of its movement in said second direction, additional force to engage said male and female couplings effects a relative sliding movement of said cylinder toward its second limit of movement on said body a distance sufficient to permit locking engagement of said male valve body and said female cylinder, and hydraulic means to move said female body portion and said female check poppet in said first direction relative to said cylinder to said cylinder's first limit of movement to unseat said male check poppet.

References Cited
UNITED STATES PATENTS

| | | | |
|---|---|---|---|
| 3,236,251 | 2/1966 | Hansen | 137—614.05 |
| 3,291,152 | 12/1966 | Comer | 137—614.04 |

WILLIAM F. O'DEA, *Primary Examiner.*

H. M. COHN, *Assistant Examiner.*